Oct. 12, 1954     F. K. H. NALLINGER     2,691,489
HEATING AND BRAKE SYSTEM
Filed Dec. 20, 1950
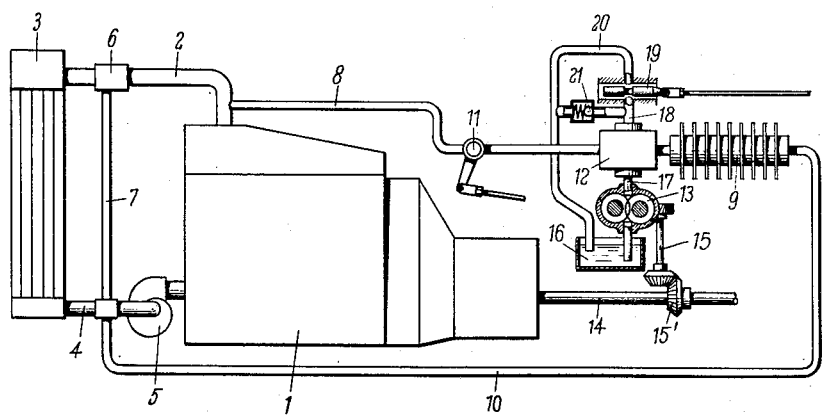
INVENTOR
FRIEDRICH K.H. NALLINGER
By:
Haseltine, Lake & Co.
AGENTS Patented Oct. 12, 1954

2,691,489

UNITED STATES PATENT OFFICE 2,691,489

HEATING AND BRAKE SYSTEM

Friedrich K. H. Nallinger, Stuttgart, Germany, assignor to Daimler-Benz Aktiengesellschaft, Stuttgart-Unterturkheim, Germany Application December 20, 1950, Serial No. 201,807

7 Claims. (Cl. 237—12.3)

The invention relates to a brake, particularly to a brake having a permanent braking effect, which is preferably used for automotive vehicles. First of all it is an object of the invention, to increase the operating economy of the vehicle. Therefore a main object of the invention is to provide facilities to make use of the heat, effected by braking the vehicle for instance when driving down hill, for other purposes, particularly such as for heating the interior of the car, or to heat up the cooling liquid of the driving engine.

Another object of the invention is to provide an improved heating system of the vehicle, particularly when such heating systems are used, which employ the heat of the cooling system of the engine by transferring this heat to warm water radiators, installed within the interior of the passenger room. In substance, these prior systems only show a transfer of heat to the cooling liquid as long as the engine itself is operating under load, but is interrupted as soon as the engine is idling, for instance when running down hill. Therefore the heating effect may be influenced greatly or may be completely interrupted, when making a long run down hill.

A further object of the invention is to provide, that the heating remains effective even at long runs down hill, by producing the necessary quantity of heat by the brakes, when the engine itself cannot produce this quantity of heat. The free energy of heat, supplied by the brakes when running down hill theoretically equals the energy of heat, which is necessary to move the vehicle up hill at the same rate of speed, deducting the double driving- and air-resistance.

The application of the invention is of particular advantage, when employed in combination with warm water heating systems for motor cars and especially for busses, but may also be used to employ the discharge of heat for other purposes, as for instance in maintaining the temperature of the engine itself.

The drawing illustrates diagrammatically an example of one embodiment of the invention, for instance the application of heating an automotive vehicle.

Referring now to said drawing a pipe-duct 2 leads from the engine 1 to the radiator 3, while another pipe-duct 4, within which the pump 5 for the cooling water is arranged, leads from the radiator 3 back to the engine 1. A heat-responsive valve 6 may be arranged within the pipe-duct 2, to either lead the cooling water to the radiator 3, or by means of the short-circuit-duct 7 directly to the pump 5.

From the duct 2 a heating-duct 8 branches off, leading to one or a plurality of warm water radiators 9, by means of which the heat of the cooling water is transferred to the air within the interior of the body, then returned by a duct 10, either to duct 4, or to engine 1. Arranged within the duct 8 or 10, there is a shut-off-valve 11, which may for instance be operated from the driver's seat, and furthermore there is a heat-transmitter 12, serving the purpose to transfer that quantity of heat, which is produced within a hydraulic brake-system, while the brake is being applied, from the brake-fluid to the cooling water within the heating-duct 8.

The brake-system comprises a pump 13, which may be of any suitable common design, such as for instance a gear-pump, the drive of which is constantly furnished by the drive-shaft 14 of the vehicle, whereby this drive may be transmitted by any suitable intermediate means, such as for instance a shaft 15 and gears 15', preferably however the pump is mounted immediately onto the drive-shaft. The pump 13 draws the brake-fluid, such as oil, out of the container 16 and presses it through a duct 17 to the heat-transmitter 12, through which the brake-fluid passes for instance by means of narrow tubes, thence a duct 18 leads it to a throttle- or shut-off-valve 19, which may for instance be operatively adjusted by means of the brake-pedal against the action of a spring, causing a gradually increasing throttling effect. A return-duct 20 leads from the throttle- or shut-off-valve 19 back to the container 16. In order to obtain the necessary brake-pressure, or to avoid unadmissible high pressure within the brake-system, when shutting off or considerably throttling the oil-flow by the valve 19, an over-pressure-safety-valve 21 has been provided, the short-circuit-duct of which bypasses the valve 19.

The operation of the system is as follows:

When driving normally, the shut-off or throttle-valve 19 is open. The constant flow of oil, produced by the pump 13, while driving, will therefore be passed back by the return-duct 20 to the container 16, without practically being throttled. Therefore the pump 13 offers no braking reaction to the drive-shaft 14. On the other hand the engine is transmitting heat to the cooling water. The main quantity of cooling water is hereby circulating through the radiator 3, or the short-circuit-duct 7. A minor quantity of cooling water however, is being passed by the heating-duct 8 and the heat-transmitter 12 (which is at this time not efficacious) to the warm-waterradiator 9 for heating the vehicle, whereby the cooling water is transferring the heat to the air within the interior of the body.

If the vehicle for instance is making a longer run on a decline, down hill, the quantity of heat transmitted by the engine 1 to the cooling water is decreased. At the same time however, the heat-transmitter 12 becomes operative, as soon as the brake is applied. The brake action is effected by bringing the shut-off- or throttling-valve into a throttling position, whereby the pump 13 must press the oil against a more or less increased resistance. Thus, the increase of effort to be produced by the pump, acts in one way like a brake on the drive-shaft 14, while on the other hand it is effective to produce heat by transforming the work of circulation by the pump into heat. This heat is transferred to the cooling water by the heat-transmitter 12, whereby the lessened heating effect, available from the engine for utilization within the warm water heating system when driving down hill, may thus be compensated entirely or at least partly. In this case the heat-transmitter 12 is preferably positioned immediately before the slide-valve 19.

The invention is not to be limited to the illustrated example of arrangement, but may be varied in any suitable way within the scope of the invention. Instead of a gear-pump, a plunger-pump, or any other suitable type of pump may be used. In place of the throttle-slide, a throttle-valve or an adjustable spring-action-pressure-valve may be used. A mechanical brake may under certain circumstances be used, instead of a hydraulic-brake, by using a suitable design of the system, so as to employ in a suitable manner the heat, produced by the friction of the brake action, for heating purposes. In case it is intended to employ the heat of the brakes to maintain an increased heat condition of the engine, it is desirable to arrange the heat-transmitter preferably within the cooling-water-duct, for instance between the water-pump and the engine. The secondary circulating system of the cooling liquid for the engine, which serves to heat the interior of the vehicle (or if desirable, for other purposes also) may be provided with its own circulating-pump. Also, a heating system, which is heated by the brake-system, and which is separated from the cooling system of the engine, may be employed. Instead of using a common shut-off-valve 11 for shutting off the heating, a short-circuit-duct, bypassing the radiator 9, or the like, may be used. Furthermore the radiator 9 (under certain circumstances including the heat-transmitter 12) may be arranged within the main circulating system of the cooling water. Instead of transmitting the heat of the brake-action by means of the cooling water, other methods, such as electrical means, or the like, may be employed to utilize the brake-heat for heating purposes.

What I claim is:

1. In a vehicle a driving engine, a drive member driven from said engine and operatively connected to the vehicle wheels, a first circulating system for cooling means for said driving engine, a second circulating system, a pump within said second circulating system, means for driving said pump by said drive member, controllable throttling means in said second circulating system adapted to cause a throttling resistance in said second circulating system and thereby a braking effect on said drive member, a heat exchanger arranged in said first circulating system on the one hand and in said second circulating system on the other hand and adapted to transfer heat from the one to the other circulating system, and heat transmitting means arranged in said first circulating system downstream of said heat exchanger in the direction of the flow of the cooling means adapted to transfer heat from the cooling means of said circulating system to the interior of the vehicle.

2. In a vehicle the combination according to claim 1 wherein the heat exchanger is arranged in said second circulating system between said pump and said throttling means.

3. In a vehicle the combination according to claim 1 wherein the heat exchanger is arranged in said second circulating system between said pump and said throttling means and said heat transmitting means is arranged immediately downstream of said heat exchanger in the direction of the flow of cooling means.

4. In a vehicle the combination according to claim 1, said first circulating system comprising a main cooler for the cooling system, pipe means leading from the driving engine to the main cooler, return pipe means leading from the main cooler to the driving engine and a branch pipe system arranged substantially parallel to said pipe means and by-passing said main cooler, said heat exchanger and said heat transmitting means being arranged in said branch pipe system.

5. In a vehicle, a brake mechanism comprising a drive member permanently connected to the vehicle wheels, a liquid circulating system, a pump in the system, drive means for driving the pump from the drive member, and an adjustable throttle in the system for establishing a resistance to the flow of liquid therethrough, an engine cooling system, and means for transferring heat caused by the resistance to flow from the circulating system to the cooling system.

6. The combination of claim 5 wherein said means comprise a heat exchanger establishing an intimate heat exchange relationship between portions of the two systems and a radiator for dissipating heat picked up by the cooling system from the circulating system.

7. In a vehicle a driving engine, a drive member driven from said engine and operatively connected to the vehicle wheels, a brake device for said drive member, a cooling circulating system of the driving engine with a circulating cooling medium comprising a main pipe system with a main cooler and a parallel pipe system by-passing the main cooler, heat transmitting means adapted to transfer heat from the circulating medium in the parallel pipe system to the interior of the vehicle and heat exchange means for transferring the heat produced by the brake device when applied for braking the vehicle to said medium circulating through said parallel pipe system between said driving engine and said heat transmitting means.

References Cited in the file of this patent

UNITED STATES PATENTS

| Number | Name | Date |
|---|---|---|
| 1,598,289 | Lee | Aug. 31, 1926 |
| 2,274,646 | Austin | Mar. 3, 1942 |
| 2,291,124 | Wallace | July 28, 1942 |

FOREIGN PATENTS

| Number | Country | Date |
|---|---|---|
| 451,719 | Great Britain | Aug. 11, 1936 |
| 509,238 | Great Britain | July 12, 1939 |